United States Patent [19]

Fallotico

[11] 3,754,569

[45] Aug. 28, 1973

[54] RESERVE FUEL SYSTEM FOR AN AUTOMOTIVE VEHICLE

[75] Inventor: John P. Fallotico, Lyndhurst, N.J.

[73] Assignee: The Raymond Lee Organization Inc., New York, N.Y.

[22] Filed: May 11, 1972

[21] Appl. No.: 252,196

[52] U.S. Cl.............. 137/572, 137/575, 280/5 A, 220/86 R
[51] Int. Cl............................................ B60k 15/06
[58] Field of Search................. 137/571, 572, 575, 137/576, 351; 220/86 R; 280/5 A

[56] References Cited
UNITED STATES PATENTS

| 845,804 | 3/1907 | Martin | 137/576 X |
| 2,035,895 | 3/1936 | Kelly | 280/5 A |
| 3,586,363 | 6/1971 | Omlid | 137/575 |
| 2,644,514 | 7/1953 | Potter | 137/576 X |

*Primary Examiner*—William R. Cline
*Attorney*—Daniel Jay Tick

[57] ABSTRACT

A reserve fuel tank is connected between the fuel filling inlet and the main fuel tank. Fuel enters the main fuel tank via a bypass conduit extending from upper side of reserve fuel tank to the main tank inlet by overflow after filling of the reserve fuel tank. A controllable valve is located in the main tank inlet between the bottom of the reserve fuel tank and the top of the main fuel tank for the release of fuel stored in the reserve fuel tank, when needed.

2 Claims, 3 Drawing Figures

PATENTED AUG 28 1973

3,754,569

RESERVE FUEL SYSTEM FOR AN AUTOMOTIVE VEHICLE

DESCRIPTION OF THE INVENTION

The present invention relates to a reserve fuel system. More particularly, the invention relates to a reserve fuel system for an automotive vehicle.

The principal object of the invention is to provide a new and improved reserve fuel system for an automotive vehicle which is automatically refilled by fuel supplied to the main fuel tank of the vehicle.

An object of the invention is to provide a reserve fuel system for an automotive vehicle which prevents the vehicle from running out of fuel.

Another object of the invention is to provide a reserve fuel system for an automotive vehicle which is of simple structure, is readily adaptable for use in new cars and for addition to existing cars.

Still another object of the invention is to provide a reserve fuel system for an automotive vehicle which is inexpensive in manufacture and inexpensive to install.

Another object of the invention is to provide a reserve fuel system for an automotive vehicle which is always maintained full.

In order that the invention may be readily carried into effect, it will now be described with reference to the accompanying drawing, wherein.

In the FIGS., the same components are identified by the same reference numerals.

An automotive vehicle such as, for example, an automobile, truck, bus, motorcycle, boat, aircraft, or any self-propelled vehicle utilizing fuel such as, for example, liquid fuel, gasoline, oil, or the like, has a main fuel tank 1 (FIGS. 1, 2 and 3) and a fuel filling inlet 2 extending from outside the vehicle to facilitate filling of said main fuel tank with fuel for operating the vehicle.

Figure 1:
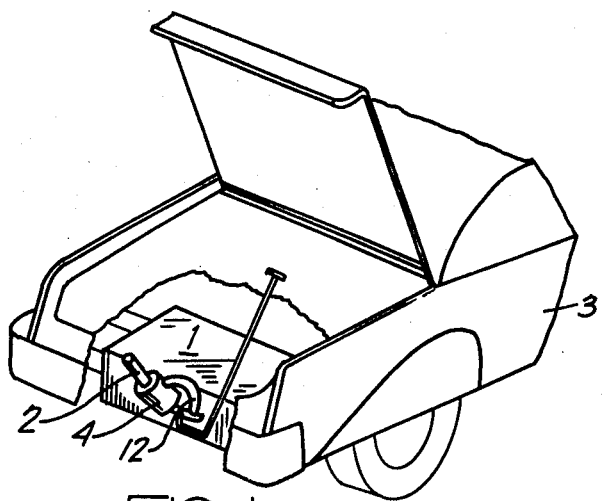
FIG. 1 is a perspective view of an embodiment of the reserve fuel system of the invention installed in an automotive vehicle.

FIG. 1 shows a vehicle 3 having the reserve fuel system of the invention installed therein. A reserve fuel tank 4 (FIGS. 1, 2 and 3) is connected between the fuel filling inlet 2 and the main tank inlet 13 in a manner whereby fuel passing through the fuel filling inlet 2 enters and fills the reserve fuel tank 4 before filling the main fuel tank 1.

Figure 2:
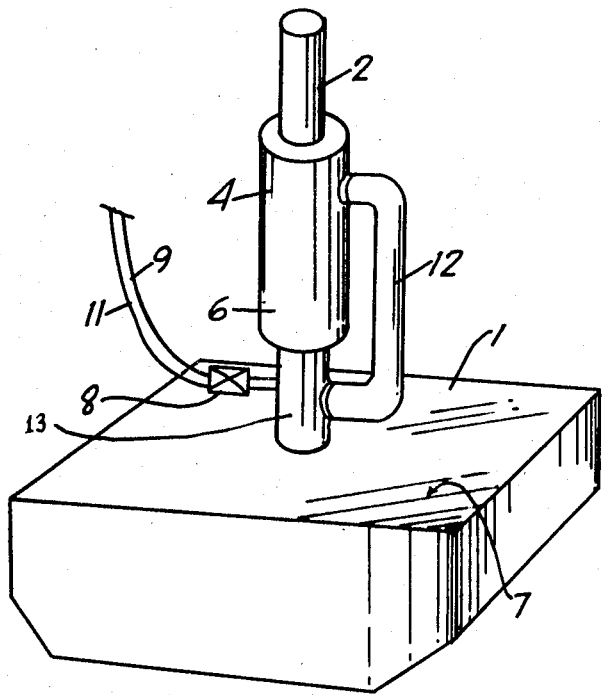
FIG. 2 is a perspective view of the reserve fuel system of the invention as installed with the main fuel tank of an automotive vehicle.
Figure 3:
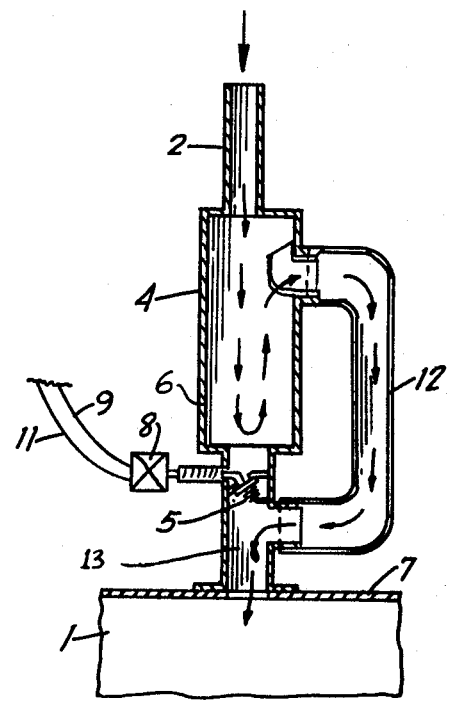
FIG. 3 is a sectional view of the reserve fuel system of the invention as installed with the main fuel tank of an automotive vehicle.

A valve 5 of any suitable type (FIG. 3) is positioned in the main tank inlet 13 between the bottom 6 of the reserve fuel tank 4 and the top 7 of the main fuel tank 1 (FIGS. 2 and 3). The valve 5 preferably comprises a spring-biased valve, as shown in FIG. 3, which is normally closed. The valve 5 is controlled by the operator of the vehicle 3 by any suitable type of valve control 8 (FIGS. 2 and 3) such as, for example, an electromagnetic or mechanical valve control.

If the valve control 8 is an electromagnetic control, it may comprise a valve-controlling solenoid energized by an electrical circuit controlled by a switch operated by the operator of the vehicle 3. If the valve control 8 is a mechanical control, it may comprise a cable coupled to the valve member and controlled by the operator of the vehicle 3. In the embodiment of FIGS. 2 and 3, the valve 5 is electromagnetically controlled by the valve control 8. The valve control 8 is thus connected in an electrical energizing circuit via electrically conductive leads or lines 9 and 11 (FIGS. 2 and 3).

A bypass conduit 12 (FIGS. 1, 2 and 3) extends from the upper side of the reserve fuel tank 4, above the reserve fuel level, to the main tank inlet 13 below the valve 5. Fuel, indicated by the arrows in FIG. 3, passes through the bypass conduit 12 by overflow after the reserve fuel tank 4 has been filled to the reserve fuel level. The fuel thus fills the reserve fuel tank 4 to overflowing, as long as the valve 5 remains in its normally closed position, and fills the main fuel tank 1 with the overflowing fuel, as shown in FIG. 3.

When the valve 5 is closed, in its normal condition, the fuel is supplied via the fuel filling inlet 2 into the reserve fuel tank 4, filling said reserve fuel tank 4 to overflowing. Fuel then flows, by overflowing, into the bypass conduit 12 through the main tank inlet 13 and fills the main fuel tank 1. When the valve 5 is opened by the operator of the vehicle 3, the fuel in the reserve fuel tank 4 flows directly into the main fuel tank 1 via the main tank inlet 13.

Thus, when the operator notes that there is very little fuel left in the main fuel tank 1, he opens the valve 5, and the fuel from the reserve fuel tank 4 flows into said main fuel tank thereby permitting the vehicle 3 to reach a service station. The reserve fuel tank 4 may be a 1, 2, 3, 4, 5 gallon tank, or may hold any number of gallons, in accordance with its design, application and the vehicle in which it is used.

While the invention has been described by means of specific examples and in specific embodiments, I do not wish to be limited thereto, for obvious modifications will occur to those skilled in the art without departing from the spirit and scope of the invention.

I claim:

1. A reserve fuel system for an automotive vehicle having a fuel filling inlet extending from outside the vehicle, a main fuel tank and a main tank inlet for directing fuel into the main fuel tank for operating the vehicle, said reserve fuel system comprising a reserve fuel tank positioned above the main fuel tank and connected between the fuel filling inlet and the main tank inlet whereby fuel passing through the fuel filling inlet passes through the reserve fuel tank, filling said reserve fuel tank before fuel flows into the main fuel tank;

valve means in the main tank inlet between the bottom of the reserve fuel tank and the top of the main fuel tank;

bypass means extending from the upper side of the reserve fuel tank above a reserve fuel level to the main tank inlet whereby when the valve means is closed fuel flows into the main fuel tank via the bypass means after the reserve fuel tank has been filled to overflowing with fuel; and valve control means for controlling the operation of the valve means, the valve control means comprising electromagnetic means controllable by an operator of the vehicle to an open position in which fuel in the reserve fuel tank flows directly into the main fuel tank via the main tank inlet and a closed position in which fuel flows into the main fuel tank only via overflow in the reserve fuel tank via the bypass means.

2. A reserve fuel system as claimed in claim 1, wherein the bypass means comprises a bypass conduit extending from the upper side of the reserve fuel tank above the fuel level to the main tank inlet allowing overflowing fuel in the reserve fuel tank to flow into the main fuel tank bypassing the valve control means holding reserve fuel in the reserve fuel tank.

* * * * *